Patented Nov. 12, 1940

2,221,563

UNITED STATES PATENT OFFICE 2,221,563

FOOD COMPOSITION

David John Young, Jr., Cliffside, N. J., assignor to Corn Products Refining Company, New York, N. Y., a corporation of New Jersey No Drawing. Application April 20, 1939, Serial No. 268,939

3 Claims. (Cl. 99—139)

This invention relates to a food composition and, more particularly, to a dry, pulverulent composition which may be converted into fudge or an icing or the like by the consumer merely by mixing the same with boiling water.

It has long been desired in the candy art to provide a candy or icing powder which can be sold as such and then made into the desired candy or icing by the consumer merely by the addition of water to the powder, thus eliminating the multi-stage mixing, melting and cooking operations.

It has heretofore been proposed (U. S. Patent No. 1,983,568, December 11, 1934) to provide the home candy maker with such a powder by (1) cooking fudge ingredients together, (2) cooling and creaming the mass to bring about granulation, (3) drying the fudge, and (4) reducing the dry product to a powder. The resulting powder is then reconstituted into a soft, smooth-textured candy body by the home candy maker merely by melting the same with water and heat and thereafter cooling the mass without a creaming or graining step. Thus the consumer was saved the troublesome process of original manufacture yet provided with a powder capable of forming, with one simple operation, a fudge having the same creamy consistency and all the fine grain and other fudge characteristics of the original product.

Obviously, however, the above described expedient involves a net economic advantage only in that the original product can be made in one large batch by the manufacturer. In other words, the described process merely transfers the cooking details and technique from the consumer to the manufacturer, thus achieving virtually no net economic gain.

The principal object of the present invention is to provide a fudge or icing powder of the general type desired without first cooking together the ingredients.

According to the process of the present invention the powder is obtained by mixing together the specified ingredients in a dry state, without any melting or cooking except the incidental melting operation applied separately to the oil ingredient of the mix. No grinding is necessary and the resulting powder, when merely mixed with hot water, will provide a highly satisfactory product without any prolonged cooking or creaming operation.

It has been found that the desired results can be obtained if there is added to the normal fudge ingredients a pure starch product which has been previously gelatinized by momentarily subjecting the starch in a wet state to the action of heat and, preferably, pressure (for example, by the process described in U. S. Letters Patent to Giesecke No. 1,974,915, September 25, 1934). The presence of such pre-gelatinized starch in the mixture stabilizes the mixture and renders it unnecessary to cook the sugar and cocoa and develop a grain by beating. The pre-gelatinized starch, because of its moisture carrying property, likewise imparts to the mixture a desirable spreading characteristic which is of value when the ultimate product is utilized as an icing or frosting.

The pre-gelatinized starch may be made according to the method of the patent above referred to, whereby the moist starch is passed between heated rolls set about 0.005 of an inch apart to bring about the disruption of some of the starch cells and conversion of some of the starch into dextrine (the resulting product when ground usually containing 87% to 92% starch, 0.1% to 0.5% protein, and 6% to 12% dextrine and having a water absorption capacity ranging from 1–8 to 1–12) or any modifications of that process, for example, by treating the starch milk, before subjecting the same to momentary gelatinization, to a preliminary acid conversion yielding a thin boiling starch (e. g. 20 fluidity).

Any starch, such as corn, (maize) tapioca, sago, or potato starch, is suitable for present purposes when so treated.

The following example, which is purely typical and not by way of limitation, illustrated the manner in which the present invention may be carried out:

Example

The principal ingredients employed, in parts by weight, are as follows:

| | Parts |
|---|---|
| Pulverized dextrose hydrate (Cerelose) | 45 |
| Pulverized XXXX cane sugar | 34 |
| Cocoa powder | 12 |
| Pre-gelatinized corn starch (Amijel) | 5 |
| Hydrogenated cocoanut oil | 4 |

To the above ingredients there is added on the basis of 100 pounds of said mixture:

| | | |
|---|---|---|
| Salt | grams | 113 |
| Aromanilla | cc | 31.8 |
| Oil sweet orange | cc | 13.6 |
| Oil bitter almond | cc | 1.1 |

The cane sugar, dextrose, pre-gelatinized corn starch, cocoa and salt (except a small portion of the cane sugar withheld for a purpose to be presently described) are thoroughly mixed dry in any suitable mixer such, for example, as a Day type mixer.

The hydrogenated cocoanut oil is then melted in a steam jacketed kettle and the melted oil added in small increments to the dry mixture in the Day mixer.

The flavoring oils are then carefully mixed, in a mortar or other mixer, with the small portion of the cane sugar originally withheld from the dry ingredients introduced into the Day mixer. As soon as the flavoring oils are thoroughly mixed together in the cane sugar, this mixture is added to the other ingredients and the resulting mix, after further mixing, is put through a 30-mesh screen.

The resulting powder is then ready for packaging.

If it is desired to make fudge candy from the powder this may be accomplished merely by mixing boiling water with the powder, in the ratio of substantially 1 part of water to 7 parts of powder by weight (3½ tablespoons of water to 12 ounces of powder); stirring the boiling mixture to obtain a homogeneous product, and then shaping as desired, for example by pressing into a pan, allowing the product to stand for ten minutes and cutting in squares. For a richer fudge, hot milk may be employed instead of hot water and, if desired, butter may be added.

By employing more water (or milk), for example 2 parts of water to 8 parts of powder (6 tablespoons of water to 12 ounces of powder), one may obtain an icing which may be spread on cake in the usual manner.

In like manner the product can be employed in the making of chocolate sauces, ice cream, fillings, and the like. In the making of butter cream frosting, butter cream fudge and the like, the product of the present invention can be utilized to obtain a satisfactory product without cooking or heating.

Instead of hydrogenated cocoanut oil one may employ any other hydrogenated vegetable oil or bland and practically tasteless and odorless edible oil or fat which will give the product gloss or sheen.

The relative proportions of sucrose and dextrose may be governed, of course, by personal taste. If a sweeter product is desired the dextrose may be omitted entirely and sucrose employed in the total amount above specified for both sugars. The relative proportion of dextrose to sucrose may be varied accordingly. Flavoring materials may likewise be varied according to taste.

The relative percentages of the ingredients may be varied somewhat without departing from the scope of the present invention.

I claim:

1. A dry, uncooked fudge powder containing, in addition to the normal fudge ingredients, ground, pre-gelatinized starch in a dry state.

2. A dry, uncooked food powder comprising, in substantially the proportions indicated, dextrose 45%, sucrose 34%, cocoa powder 12%, gelatinized starch 5% and fat 4%.

3. Method of making a dry, uncooked food powder which consists in mixing the normal uncooked fudge ingredients with ground, pre-gelatinized starch in a dry state.

DAVID JOHN YOUNG, Jr.